US012705055B2

(12) United States Patent
Alexander et al.

(10) Patent No.: US 12,705,055 B2
(45) **Date of Patent: *Aug. 11, 2026**

(54) REPEAT INSTRUCTION FOR LOADING AND/OR EXECUTING CODE IN A CLAIMABLE REPEAT CACHE A SPECIFIED NUMBER OF TIMES

(71) Applicant: Graphcore Limited, Bristol (GB)

(72) Inventors: Alan Graham Alexander, Wotton-under-Edge (GB); Simon Christian Knowles, Corston (GB); Mrudula Chidambar Gore, Bath (GB); Jonathan Ferguson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 1161 days.

This patent is subject to a terminal disclaimer.

(21) Appl. No.: 17/654,449

(22) Filed: Mar. 11, 2022

(65) Prior Publication Data

US 2022/0197645 A1 Jun. 23, 2022

Related U.S. Application Data

(63) Continuation of application No. 16/276,895, filed on Feb. 15, 2019, now Pat. No. 11,567,768.

(30) Foreign Application Priority Data

Dec. 27, 2018 (GB) ..................................... 1821229

(51) Int. Cl.

| | |
|---|---|
| ***G06F 9/30*** | (2018.01) |
| ***G06F 9/38*** | (2018.01) |
| ***G06F 12/0875*** | (2016.01) |

(52) U.S. Cl.

CPC ...... *G06F 9/30065* (2013.01); *G06F 9/30076* (2013.01); *G06F 9/3808* (2013.01); *G06F 9/381* (2013.01); *G06F 12/0875* (2013.01)

(58) Field of Classification Search

CPC ............... G06F 9/3004; G06F 9/30043; G06F 9/30047; G06F 9/3005; G06F 9/30065;

(Continued)

(56) References Cited

U.S. PATENT DOCUMENTS 5,303,355 A * 4/1994 Gergen ............... G06F 9/30065 712/E9.05
5,511,178 A 4/1996 Takeda (Continued)

FOREIGN PATENT DOCUMENTS

JP S60241136 A 11/1985
JP H1173318 A 3/1999

(Continued)

OTHER PUBLICATIONS

Dictionary.com, "Buffer", Jun. 27, 2018, Retrieved from the Internet < URL: https://web.archive.org/web/20180627221850/https://www.dictionary.com/browse/buffer >.*

(Continued)

*Primary Examiner* — David J. Huisman
(74) *Attorney, Agent, or Firm* — HAYNES AND BOONE, LLP

(57) ABSTRACT

A processor is disclosed including: a barrel-threaded execution unit for executing concurrent threads, and a repeat cache shared between the concurrent threads. The processor's instruction set includes a repeat instruction which takes a repeat count operand. When the repeat cache is not claimed and a first repeat instruction is executed in a first thread, a portion of code is cached from the first thread into the repeat cache, the state of the repeat cache is changed to record it as (Continued)

claimed, and the cached code is executed a number of times. When a further repeat instruction is then executed in a further thread, the already-cached portion of code is again executed a respective number of times, each time from the repeat cache. For each of the first and further repeat instructions, the repeat count operand in the respective instruction specifies the number of times to execute the cached code.

4 Claims, 4 Drawing Sheets

(58) Field of Classification Search
CPC .... G06F 9/30076; G06F 9/3808; G06F 9/381; G06F 9/3814; G06F 9/46; G06F 9/4881; G06F 9/52; G06F 12/0875; G06F 2212/1028; G06F 2212/452; Y02D 10/00
See application file for complete search history.

(56) References Cited

U.S. PATENT DOCUMENTS

| | | | | |
|---|---|---|---|---|
| 5,579,493 | A | 11/1996 | Kiuchi | |
| 7,178,013 | B1 | 2/2007 | Batcher | |
| 9,348,595 | B1 | 5/2016 | Mizrahi et al. | |
| 11,567,768 | B2 * | 1/2023 | Alexander | G06F 9/526 |
| 2002/0016887 | A1 | 2/2002 | Scales | |
| 2002/0078333 | A1 | 6/2002 | Inoue | |
| 2002/0103847 | A1 * | 8/2002 | Potash | G06F 9/544 718/107 |
| 2008/0155236 | A1 | 6/2008 | Wilson et al. | |
| 2008/0294882 | A1 | 11/2008 | Jayapala | |
| 2015/0220347 | A1 | 8/2015 | Glossner et al. | |
| 2018/0181400 | A1 | 6/2018 | Scherbinin et al. | |

FOREIGN PATENT DOCUMENTS

| | | | |
|---|---|---|---|
| JP | 2002268878 | A | 9/2002 |
| JP | 2004516571 | A | 6/2004 |
| JP | 2011070695 | A | 4/2011 |
| JP | 2013541758 | A | 11/2013 |
| JP | 2017228213 | A | 12/2017 |
| JP | 2019079530 | A | 5/2019 |
| WO | 2008155834 | A1 | 8/2010 |
| WO | 2018169911 | A1 | 9/2018 |

OTHER PUBLICATIONS

Dictionary.com, “Cache”, Jul. 7, 2018, Retrieved from the Internet < URL: https://web.archive.org/web/20180707233220/https://www.dictionary.com/browse/cache >.*

Merriam-Webster.com, “Buffer”, May 1, 2015, Retrieved from the Internet < URL: https://web.archive.org/web/20150501175913/https://www.merriam-webster.com/dictionary/buffer >.*

Merriam-Webster.com, “Cache”, Aug. 27, 2016, Retrieved from the Internet < URL: https://web.archive.org/web/20160827184519/https://www.merriam-webster.com/dictionary/cache >.*

Notice of Allowance dated Aug. 8, 2023 for Chinese Patent Application No. 201910559689.4.

Chinese Search Report-Office Action dated Mar. 14, 2023 for Chinese Patent Application No. 201910559689.4.

Office Action issued Aug. 18, 2020 for Japanese Patent Application No. 2019-113318. 13 pages.

Simultaneous multithreading. In: Wikipedia, the free encyclopedia. Processing status: Dec. 17, 2018. URL: https://en.wikipedia.org/w/index.php?title=Simultaneous_multithreading&oldid=874139330 [retrieved on Mar. 6, 2020].

Thread (computing). In: Wikipedia, the free encyclopedia. Processing status: Mar. 12, 2018. URL: https://en.wikipedia.org/w/index.php?title=Thread_(computing)&oldid=871757983 [retrieved on Mar. 6, 2020].

Barrel processor. In: Wikipedia, the free encyclopedia. Processing status: Mar. 26, 2018. URL: https://en.wikipedia.org/w/index.php?title=Barrel_processor&oldid=870708296 [retrieved on Mar. 6, 2020].

Thread pool. In: Wikipedia, the free encyclopedia. Processing status: Nov. 19, 2018. URL: https://en.wikipedia.org/w/index.php?title=Thread_pool&oldid=869616238 [retrieved on Mar. 6, 2020].

Ratkovic Ivan [ et al.]: Chapter One—An Overview of Architecture-Level Power- and Energy-Efficient Design Techniques. In: Advances in Computers, 98, May 2015, pp. 1, 2, 12, 34, 35.—ISSN 0065-2458. http://hdl.handle.net/2117/88607 [retrieved on Mar. 9, 2020].

Office Action dated Mar. 10, 2020 for German Patent Application No. 10-2019-112-301.1.

Combined Search and Examination Report for United Kingdom Patent Application No. GB1821229.0 dated Aug. 22, 2019. 4 pages.

* cited by examiner

Time (in slots)

S0 S1 S2 S3 S0 S1 S2 S3 S0 S1 S2 S3 ...

Round n Round n+1 Round n+2 ...

Time (in rounds)

Slot S0 SV W0 SV W5 SV ...

Slot S1 SV W1 SV W4 SV ...

Slot S2 SV W2 SV ...

Slot S3 SV W3 SV W6 SV ...

4
J worker contexts
CX0
CX1
CXJ-1
CXS
41
41
41
PC
CSRs
MRF
26M
ARF
26A
WRF
26W
Supervisor context
Context registers
Program counters 21
Control state registers 28
Operand registers 32
26
31
Repeat cache
35
33
18
Execution unit
Decode
16
Fetch
Instruction memory
12
14
13
Scheduler
24

REPEAT INSTRUCTION FOR LOADING AND/OR EXECUTING CODE IN A CLAIMABLE REPEAT CACHE A SPECIFIED NUMBER OF TIMES

CROSS-REFERENCE TO RELATED APPLICATIONS

This application is a continuation of U.S. patent application Ser. No. 16/276,895, filed Feb. 15, 2019, now issued as U.S. Pat. No. 11,567,768, which claims the priority benefit under 35 U.S.C. § 119 of United Kingdom Patent Application No. 1821229.0, filed Dec. 27, 2018, the entire contents of which are incorporated herein by reference in their entireties.

TECHNICAL FIELD

The present disclosure relates to an instruction cache for caching portions of machine code in a multi-threaded processor.

BACKGROUND

There has been increasing interest in developing processors designed for specific applications, such as graphics processing units (GPUs) and digital signal processors (DSPs).

Another type of application-specific processor which has gained interest recently is one dedicated to machine intelligence applications, dubbed by the applicant as an "IPU" (intelligence processing unit). These may be employed for example as accelerator processors arranged to perform work allocated by a host, such as to train or assist in training a knowledge model such as a neural network, or to perform or assist in performing predictions or inferences based on such a model.

A machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

Hence a processor designed for machine intelligence applications may include support for concurrent execution of multiple program threads. This support typically comprises a respective set of context registers for each thread, wherein each set is used to hold the program state (the "context") of a respective one of a plurality of threads to be executed concurrently. The program state held in the context registers of a given thread typically comprises a program counter for that thread, one or more control state registers recording a state of the thread (e.g. paused, running etc.), and a plurality of operand registers including arithmetic operand registers for temporarily holding values to be operated upon and output by arithmetic instructions of the respective thread. The different concurrent threads are temporally interleaved through a common execution pipeline in a different respective execution time slots, each slot making use of only the registers of a different respective one of the sets of context registers.

In another approach, a processor designed for machine intelligence may comprise multiple parallel execution units each comprising a separate pipeline (i.e. true parallelism, as opposed to concurrency which means interleaving). The processor may be divided into an array of tiles, each comprising its own execution unit and memory for use by that execution unit, thus implementing an array of parallel processing modules on the same chip or even spread across multiple chips. A processor may even combine this arrangement with the concurrent approach, i.e. so as to comprise an array of multiple tiles where each tile is configured to run multiple concurrent threads.

SUMMARY

It is recognized herein that circumstances may occur where it is desired for multiple different threads to run the same code. An example can occur in a machine learning application where each thread performs the processing of a different respective node. In this case, it is recognized herein that some nodes may in fact perform some of the same computations. There would be a saving in terms of power consumption if this code did not have to be fetched separately from memory by the threads of all such nodes. Similar issues may occur in other applications where different concurrent processes comprise some or all of the same operations.

According to one aspect disclosed herein, there is provided a processor comprising: an execution unit configured to execute instances of instructions defined in an instruction set, wherein the execution unit is a barrel-threaded execution unit configured to run a plurality of concurrent threads each in a different respective one of a repeating sequence of interleaved time slots; and a repeat cache having an associated state recording whether or not the repeat cache is currently claimed by one of the threads. The instructions defined in the instruction set include a repeat instruction which takes a repeat count operand, the execution unit being configured so as: a) when the repeat cache is not currently claimed according to said state and an instance of the repeat instruction is executed in a first thread of said threads, to cache a portion of code from the first thread into the repeat cache, to modify said state to record the repeat cache as claimed, and to execute said portion of code a respective number of times, taking each successive repetition of the first portion of code from the repeat cache, and b) when the repeat cache is currently claimed according to said state and another instance of the repeat instruction is then executed as part of any further threads of said threads before the state is next reset to record the repeat cache as unclaimed again, to execute the portion of code as already cached in the repeat cache a respective number of times, each time from the repeat cache. For each instance of the repeat instruction, the repeat count operand in the respective instance of the repeat instruction specifies the respective number of times the portion of code is executed, the repeat count operand being able to specify any of a plurality of positive integer values for the respective number of times to execute the portion of code.

Thus the presently-disclosed processor advantageously provides a mechanism whereby, not only can the first thread re-use its own code multiple times based on the repeat cache, but also further threads can re-use the same code already cached by the first thread without having to separately fetch that same code from memory.

In embodiments, said portion of code may be a portion following the instance of the repeat instruction in the first thread.

In embodiments, the repeat instruction may take a repeat size operand for specifying a size of said portion of code, wherein said portion of code may run from a predefined point following the instance of the repeat instruction in the first thread, up to a subsequent point defined by the size operand of the respective instance of the repeat instruction in the first thread.

The repeat size operand may specify the size in terms of the number of individual instructions following said predefined point, or in terms of a number of instruction bundles following said predefined point (each bundle comprising a plurality of instructions, e.g. two or four instructions per instruction bundle).

In embodiments, the repeat count operand in each instance of the repeat instruction may additionally be able to take a value of zero, wherein if the repeat count operand of a given instance of the repeat instruction is zero, the given instance of the repeat instruction causes the execution unit to skip execution of the portion of code in the respective thread, including in the case of the first thread.

In embodiments, if the repeat count operand of a given instance of the repeat instruction run in a respective thread is one, the given instance of the repeat instruction may cause the execution unit to execute the cached portion of code, as part of the respective thread, only once without repetition.

In embodiments, the repeat count operand may be an immediate operand, and/or the repeat size operand may be an immediate operand.

In embodiments, the repeat count operand may specify the respective number of times to execute the portion of code by reference to a register from which to read the respective number, and/or the repeat size operand may specify the size by reference to a register from which to read the size.

In embodiments, the processor may comprise a hardware mechanism for automatically resetting said state to record the repeat cache as unclaimed again once at least one of the first and further threads has finished executing the cached portion of code for its respective number of times.

In embodiments, the mechanism may be configured to automatically reset said state when the first thread has finished executing the cached portion of code for its respective number of times.

Alternatively, the mechanism may be configured to automatically clear the claim to the repeat cache when all first and further threads have finished executing the cached portion of code for their respective numbers of times.

The state of the repeat cache, recording whether it is claimed, may for example be implemented as internal state of the repeat cache or execution unit (one or more latches in internal circuitry), or alternatively it may be implemented in a register in a register file (e.g. one of the context registers of the first thread or the supervisor-see below).

In some cases it may be desired for multiple different threads to run the same code, but operating on different data. Again an example can occur in a machine learning application. For instance consider again the case where each thread performs the processing of a different respective node. It turns out that many nodes may in fact comprise the same process but acting on its own respective input data, e.g. where the nodes in question represent the exact same function but have different input connections (edges) in the graph.

Hence in embodiments, the processor may comprise a plurality of sets of context registers, each set arranged to hold a program state of a respective one of the concurrent threads; and the execution unit may be configured so as, in response to instances of the repeat instruction in the first and further threads, to execute said same portion of code but operating on one or more respective operands values as held in one or more of the respective thread's own respective set of context registers.

In embodiments, said concurrent threads may comprise a plurality of worker threads and the execution unit may be further arranged to run, at least at some times, a supervisor subprogram comprising at least one supervisor thread configured to manage the worker threads.

In embodiments, the context registers may comprise a respective one of the sets of context registers for each of the worker threads that can be executed concurrently, and an additional set of context registers arranged to hold a program state of the supervisor subprogram.

In embodiments, the supervisor subprogram may be arranged to begin by initially running in all the slots, and then to launch the worker threads by relinquishing each of some or all of the slots in which the supervisor subprogram was initially running to respective ones of the worker threads.

In embodiments, the instruction set may include a run instruction which, when executed as part of the supervisor subprogram, causes the slot in which the run instruction is executed to be relinquished to one of the worker threads such that the worker thread is launched in that slot in place of the supervisor subprogram.

In embodiments, the instruction set may include an exit instruction which, when executed as part of one of the worker threads, causes the slot in which the exit instruction is executed to be handed back to the supervisor subprogram such that the supervisor subprogram continues running in that slot again in place of the one of the worker threads.

In some cases, applications may arise whereby threads may in fact operate on some of the same operand values but also on some other operands that are specific to the individual thread. An example would be a vector or matrix multiplication performed as part of a convolution, whereby the instruction in each thread multiplies a common set of weights (shared between threads) with input data that is specific to the individual thread. A particular example of this can occur in a convolutional neural network where many nodes in fact comprise the same weights but with different connections. Consider for example a scenario where each thread is configured to perform the processing of a different respective node in the neural network, such as convolving a common kernel of weights with respective input data to detect a certain feature. In such scenarios, it would be advantageous to provide a mechanism allowing a given arithmetic instruction to operate on a combination of one or more common weight operands shared between threads and one or more operands specific to the individual respective thread. The issue is by no means specific to neural networks and could arise in any application that ends up using some shared operand values and some thread-specific operands.

Accordingly, in embodiments, at least one of the instructions in said portion of code may be of a type that operates on a combination of i) at least operand value from at least one context register, and ii) at least one operand value from at least one register in a set of common operand registers common to the worker threads.

In embodiments, the set of shared register files may be configured so that only the supervisor subprogram can write value to the set of common registers, whereas the worker threads may only be able to read from the set of common registers.

According to another aspect of the present invention, there is provided a computer program embodied on computer-readable storage, comprising code configured to run on the processor of any preceding embodiment, wherein the code comprises said threads, at least some of which include instances of the repeat instruction arranged such that at least one of the threads re-uses the portion of code cached in the repeat cache by another of the threads.

According to another aspect of the present invention there is provided a method comprising running a program comprising said threads on the processor through the execution unit, at least some of the threads including instances of the repeat instruction arranged such that at least one of the threads re-uses the portion of code cached in the repeat cache by another of the threads.

In embodiments the program may be further configured to operate in accordance with any of the configurations disclosed herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figures 1, 2, 3:
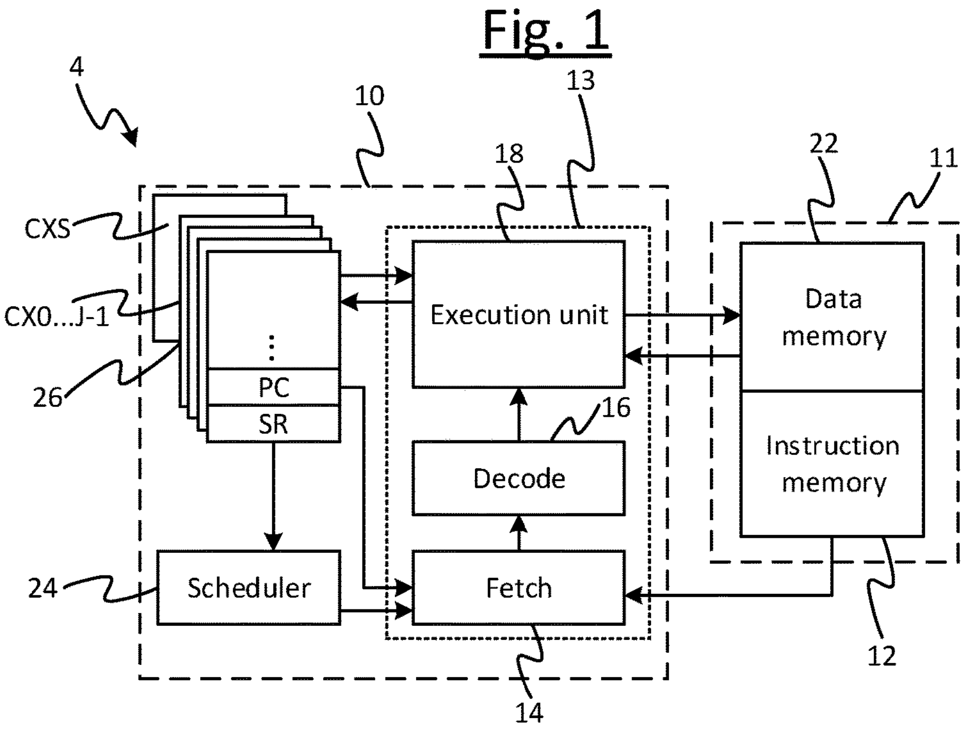
FIG. 1 is a schematic block diagram of an example multi-threaded processor.
FIG. 2 schematically illustrates a scheme of interleaved time slots.
FIG. 3 schematically illustrates a supervisor thread and plurality of worker threads running in a plurality of interleaved time slots.

FIG. 1 illustrates an example of a processor 4 in accordance with embodiments of the present disclosure. The processor 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be occupied by a given thread. This may also be referred to as concurrent execution, discussed in more detail shortly. The memory 11 comprises an instruction memory 12 and a data memory 22 (which may be implemented in different addressable memory units or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a plurality of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands. In embodiments the program comprises a plurality of worker threads, and a supervisor subprogram which may be structured as one or more supervisor threads. These will be discussed in more detail shortly.

A multi-threaded processor is a processor which is capable of executing multiple program threads alongside one another, typically in a concurrent manner. Concurrent execution means the threads share a common execution pipeline (or at least a common part of a pipeline) and different threads are interleaved through this same, shared execution pipeline in different interleaved time slots in a repeating cycle. This increases performance due to increased opportunities for hiding pipeline latency. The processor comprises some hardware that is common to the multiple different threads (e.g. a common instruction memory, data memory and/or execution unit); but to support the multi-threading, the processor also comprises some dedicated hardware specific to each thread.

The dedicated hardware comprises a separate set of context registers 26 for at least each of the threads that can be executed concurrently, i.e. one set per slot in the cycle. A "context", when talking about multi-threaded processors, refers to the program state of a respective one of the threads being executed alongside one another (e.g. program counter value, status and current operand values). The context registers refer to the respective registers for representing this program state of the respective thread. Registers in a register file are distinct from general memory in that register addresses are fixed as bits in instruction words, whereas memory addresses can be computed by executing instructions.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises a plurality of sets of context registers 26, each set 26 arranged to represent the state (context) of a different respective one of the threads that can be executed concurrently. The multi-threaded processing unit 10 also comprises a shared execution pipeline 13 that is common to the concurrently executed threads, and a scheduler 24 for scheduling the concurrent threads for execution through the shared pipeline in an interleaved manner, e.g. in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture.

Each set of context registers 26 comprises a respective one or more control registers comprising at least a program counter (PC) for the respective thread (for keeping track of the instruction address at which the thread is currently executing), and in embodiments also a set of one or more control state registers (CSRs) recording a current status of the respective thread (such as whether it is currently running or paused). Each set of context register files 26 also comprises a respective set of operand registers, for temporarily holding operands of the instructions executed by the respective thread, i.e. values operated upon or resulting from operations defined by the opcodes of the respective thread's instructions when executed. Each set of registers 26 may be implemented in one or more register files.

The fetch stage 14 has access to the program counter (PC) of each of the contexts. For each respective thread, the fetch stage 14 fetches the next instruction of that thread from the next address in the program memory 12 as indicated by the program counter. The program counter automatically increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers specified in the instruction, in order for the instruction to be executed. The execution unit 18 has access to the operand registers and the control state registers, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

An example of the interleaving scheme implemented by the scheduler 24 is illustrated in FIG. 2. Here the concurrent threads are interleaved according to a round-robin scheme whereby, within each round of the scheme, the round is divided into a sequence of time slots S0, S1, S2 . . . . SJ−1 (e.g. J=4, or J=6), each slot for executing a respective thread. Typically each slot is one execution cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

In embodiments, the context registers 26 comprises a respective set of worker context registers CX0 . . . CX(J−1) for each of the number J of threads that can be executed concurrently (J=3 in the example illustrated but this is not limiting), and one additional supervisor context register file CXS. The worker context register files holds the contexts of worker threads, and the supervisor context register file holds the context of a supervisor thread. Note that in embodiments the supervisor context has a different number of registers than each of the workers. The processing unit 10 thus comprises one more context register file 26 than there are time slots, i.e. it supports one more context than the number of interleaved timeslots it is capable of barrel-threading.

Each of the worker contexts CX0 . . . CXJ−1 is used to represent the state of a respective one of a plurality of worker threads currently assigned to one of the J (e.g. four) execution time slots S0 . . . SJ−1, for performing whatever application-specific computation tasks are desired by the programmer (note again this may only be subset of the total number of worker threads of the program as stored in the instruction memory 12). The additional context CXS is used to represent the state of a “supervisor thread” (SV) whose role it is to coordinate the execution of the worker threads, at least in the sense of assigning which of the worker threads W is to be executed in which of the time slots S0, S1, S2 . . . at what point in the overall program. Optionally the supervisor thread may have other “overseer” or coordinating responsibilities, such as performing external exchanges or barrier synchronisations. Note of course that the illustrated case of J=4 is just one example implementation for illustrative purposes. E.g. in another implementation J=6 (six time slots, six worker contexts and one supervisor context).

Referring to FIG. 3, in embodiments the supervisor thread SV does not have its own time slot per se in the scheme of interleaved execution time slots. Nor do the workers as allocation of slots to worker threads is flexibly defined. Rather, each time slot has its own set of context registers for storing worker context, which is used by the worker when the slot is allocated to the worker, but not used when the slot is allocated to the supervisor. When a given slot is allocated to the supervisor, that slot instead uses the context register file CXS of the supervisor. The supervisor always has access to its own context and no workers are able to occupy the supervisor context register file CXS.

The supervisor thread SV has the ability to run in any and all of the time slots S0 . . . S3 (or more generally S0 . . . SJ−1). The scheduler 24 is configured so as, when the program as a whole starts, to begin by allocating the supervisor thread to all of the time slots, i.e. so the supervisor SV starts out running in all of S0 . . . SJ−1. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 3 (or more generally W0 . . . WJ−1). This is achieved by the supervisor thread executing a run instruction, which takes at least address of a worker thread in the instruction memory 12 as an operand. The worker threads are portions of code that can be run concurrently with one another, each representing one or more respective computation tasks to be performed.

The run instruction acts on the scheduler 24 so as to relinquish the current time slot, in which this instruction is itself executed, to the worker thread specified by the operand. Note that it is implicit in the run instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the run instruction.

The supervisor thread SV performs a similar operation in each of one or more others of the time slots, to give away some or all of its time slots to different respective ones of the worker threads W0 . . . WJ−1 (selected from a larger set of possible worker threads in the instruction memory 12). Once it has done so for the last slot, the supervisor is suspended (then later will resume where it left off when one of the slots is handed back by a worker W). The supervisor thread SV is thus able to allocate different worker threads, each performing one or more tasks, to different ones of the interleaved execution time slots S0 . . . SJ−1 (e.g. J=4 as illustrated, or J=6). When the supervisor thread determines it is time to run a worker thread, it uses the run instruction to allocate this worker to the time slot in which the run instruction was executed.

In some embodiments, the instruction set also comprises a variant of the run instruction, "run-all". This instruction is used to launch a set of more than one worker together, all executing the same code. In embodiments this launches a worker in every one of the processing unit's slots S0 . . . S3 (or more generally S0 . . . S(J−1)).

Once launched, each of the currently allocated worker threads W0 . . . WJ−1 proceeds to perform the one or more computation tasks defined in the code specified by the respective run instruction. At the end of this, the respective worker thread then hands the time slot in which it is running back to the supervisor thread. This is achieved by executing an exit instruction in the respective worker thread. The exit instruction acts on the scheduler 24 so as to pass back the current time slot, in which this instruction is itself executed, to the supervisor thread. In response the scheduler 24 then continues running the supervisor in that slot.

Figure 4:
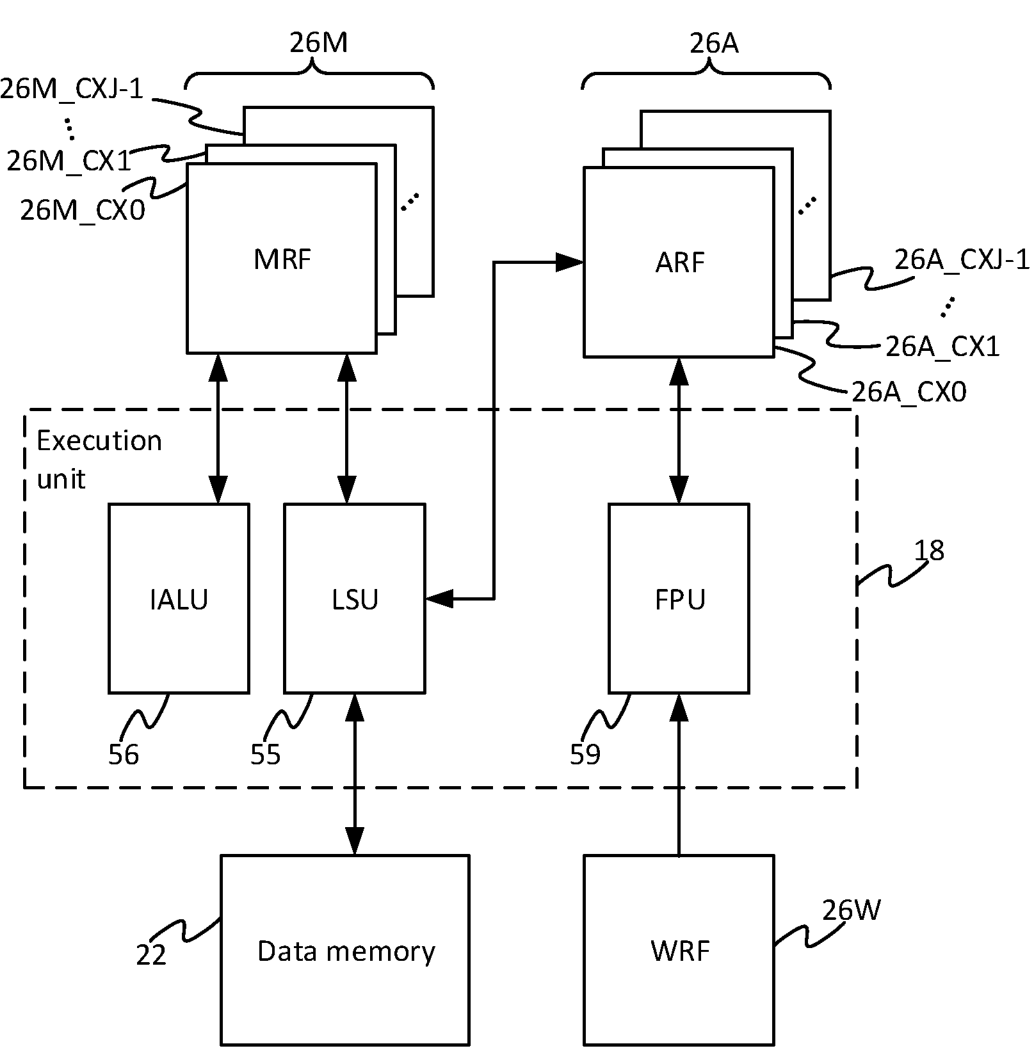
FIG. 4 is a schematic block diagram illustrated further detail of an example processor according to embodiments.

FIG. 4 illustrates further example details of the processor 4 including detail of the execution unit 18 and context registers 26. The context registers 26 comprise a respective main register file (MRF) 26M for each of the worker M contexts and the supervisor context. The context registers further comprise a respective auxiliary register file (ARF) 26A for at least each of the worker contexts. The context registers 26 further comprise a common weights register file (WRF) 26W, which all the currently executing worker thread can access to read from. The WRF may be associated with the supervisor context in that the supervisor thread is the only thread that can write to the WRF. The context registers 26 may also comprise a respective group of control state registers for each of the supervisor and worker contexts (not shown). The execution unit 18 comprises load-store unit (LSU) 55, an integer arithmetic logic unit (IALU) 56, and a floating point arithmetic unit (FPU) 59.

In each of the J interleaved time slots S0 . . . SJ−1, the scheduler 24 controls the fetch stage 14 to fetch at least one instruction of a respective thread from the instruction memory 11, into the respective one of J instruction buffers (not shown) corresponding to the current time slot. In embodiments each time slot is one execution cycle of the processor, though other schemes are not excluded (e.g. weighted round-robin). In each execution cycle of the processor 4 (i.e. each cycle of the processor clock which clocks the program counter) the fetch stage 14 fetches either a single instruction or a small "instruction bundle" (e.g. a two-instruction bundle or four-instruction bundle), depending on implementation. Each instruction is then issued, via the decode stage 16, into one of the LSU 55, IALU 56, or FPU 59, depending on whether the instruction (according to its opcode) is a memory access instruction, an integer arithmetic instruction or a floating point arithmetic instruction, respectively. In embodiments, the LSU 55 and IALU 56 execute their instructions using registers from the MRF 26M, with the particular registers within the MRF 26M being specified by operands of the instructions. The FPU 59 performs operations using registers in the ARF 26A and WRF 26W, where the particular registers within the ARF are specified by operands of the instructions. In embodiments the registers in the WRF may be implicit in the instruction type (i.e. pre-determined for that instruction type).

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However, in embodiments there is a single, shared weights register file (WRF) shared between the threads. Each thread can access the MRF and ARF of only its own context 26. However, all currently-running worker threads can access the common WRF. The WRF thus provides a common set of weights for use by all worker threads. In embodiments only the supervisor can write to the WRF, and the workers can only read from the WRF.

The instruction set of the processor 4 includes at least one type of load instruction whose opcode, when executed, causes the LSU 55 to load data from the data memory 22 into the respective ARF, 26A of the thread in which the load instructions was executed. The location of the destination within the ARF is specified by an operand of the load instruction. Another operand of the load instruction specifies an address register in the respective MRF, 26M, which holds a pointer to an address in the data memory 22 from which to load the data. The instruction set of the processor 4 also includes at least one type of store instruction whose opcode, when executed, cases the LSU 55 to store data to the data memory 22 from the respective ARF of the thread in which the store instruction was executed. The location of the source of the store within the ARF is specified by an operand of the store instruction. Another operand of the store instruction specifies an address register in the MRF, which holds a pointer to an address in the data memory 22 to which to store the data. In general the instruction set may include separate load and store instruction types, and/or at least one load-store instruction type which combines one or more load operations and/or one or more store operations in a single instruction.

The instruction set of the processor 4 also includes one or more types of arithmetic instruction for performing arithmetic operations. E.g. these may include add, multiply instructions, Boolean logic instructions, etc. Each arithmetic instruction, takes one or more source operands specifying one or more source registers in one of the register files 26 of the respective thread, and one or more destination operands specifying one or more destination registers in one of the register files 26 of the respective thread. When executed, the arithmetic instruction performs an arithmetic operation upon one or more source operand values from the one or more source registers and places the result in the destination register. The source operand value(s) were loaded into the source operand register(s) by one or more previous load or load-store instructions. The result is saved from the destination register(s) by one or more subsequent store or load-store instructions. The arithmetic instructions preferably include one or more floating point arithmetic instructions whose one or more sources operand values are floating point values and whose one or more results are floating point values. The floating point arithmetic instructions are executed by the FPU 59. In embodiments, the FPU 59 is configured to use the ARF, 26A, for the source and destination registers of the arithmetic instructions. I.e. it is implicit (predetermined) that the source and destination operands specify a register location within the ARF. In embodiments the instruction set may also include one or more integer arithmetic instructions which are executed by the IALU 56. In embodiments these use source and destination registers in the MRF, 26M.

According to certain embodiments disclosed herein, the floating point arithmetic instructions may include at least one type which makes use of the common weights register file, WRF, 26W. This type of instruction takes at least one operand which specifies at least one source of the corresponding arithmetic operation in the respective ARF, 26A, of the thread in which the arithmetic instruction was executed. However, at least one other source of the arithmetic instruction is in the common WRF, common to all the worker threads. Preferably this source is implicit in the arithmetic instruction in question (i.e. implicit for this type of arithmetic instruction). Implicit in the sense of a machine code instruction means not requiring an operand to specify. I.e. in this case, the location of the source in the WRF is inherent from the opcode (predetermined for that particular opcode). In response to the opcode, the FPU 59 performs an arithmetic operation, as specified by the opcode, which comprises operating upon the values in the specified source register(s) in the threads' respective ARF and the implicit source register(s) in the WRF. It also outputs a result of the arithmetic operation to a destination register in the thread's respective ARF as specified explicitly by a destination operand of the arithmetic instruction.

Example types of arithmetic instruction that may employ an implicit source in the common WRF, 26W, may include: one or more vector multiplication instruction types, one or more matrix multiplication instruction types, one or more accumulating vector multiplication instruction types and/or accumulating matrix multiplication instruction types (which accumulate a result of the multiplication from one instance of the instruction to the next), and/or one or more convolution instruction types. For example, a vector multiplication instruction type may multiply an explicit input vector from the ARF, 26A, with a predetermined vector of weights from the WRF; or a matrix multiplication instruction type may multiply an explicit input vector from the ARF with a predetermined matrix of weights from the WRF. As another example, a convolution instruction type may convolve an input matrix from the ARF with a predetermined matrix from the WRF. Having a shared weights register file, WRF, common to a plurality of threads, enables each thread to multiply or convolve a common kernel with its own respective data. This is useful as this is a scenario that comes up a lot in machine learning applications, e.g. where each thread represents a different node in a neural network and the common kernel represents a feature being searched or trained for (for instance an edge or particular shape in an area or volume of graphical data).

In embodiments the values in the WRF, 26W, can be written by the supervisor thread. The supervisor (which in embodiment begins by running in all the slots S0 . . . SM) first executes a series of put instructions to write the values of some *commune* weights into the predetermined location in the WRF. It then executes run instructions (or a run-all instruction) to launch a respective worker in some or all of the slots S0 . . . SJ−1. Each worker then includes one or more instances of one or more arithmetic instructions of the type(s) discussed above, so as to perform the corresponding arithmetic operation(s) upon their own respective input data, as loaded into their respective ARF, 26A, but using the common weights written by the supervisor into the WRF, 26W. When each thread finishes its respective task it executes an exit instruction to hand its slot back to the supervisor. When all the launched threads have finished their respective tasks, the supervisor can write new values to the WRF and launch a new set of threads (or launch a new set to continue to use the existing values in the WRF).

It will be appreciated that the labels "main", "auxiliary" and "weights" are not necessarily limiting. In embodiments they may be any first register file (per worker context), second register file (per worker context) and shared third register file (e.g. part of the supervisor context but accessible to all workers). The ARF 26A and auxiliary execution unit 18 may also be referred to as the arithmetic register file and arithmetic execution unit since they are used for arithmetic instructions (or at least the floating point arithmetic). The MRF 26M and auxiliary execution unit 18 may also be referred to as the memory address register file and arithmetic execution unit since one of their uses is for accessing memory. The weights register file (WRF) 26W is so-called because it is used to hold multiplicative weights used in a certain type or types of arithmetic instruction, to be discussed in more detail shortly. E.g. these could be used to represent the weights of nodes in a neural network. Seen another way, the MRF could be called the integer register file as it is used to hold integer operands, whilst the ARF could be called the floating-point register file as it is used to hold floating-point operands. In alternative embodiments however, note that the register space 26 is not necessarily divided into these separate register files for these different purposes. Instead instructions executed through the main and auxiliary execution units may be able to specify registers from amongst the same shared register file (one register file per context in the case of a multithreaded processor).

Figure 5:
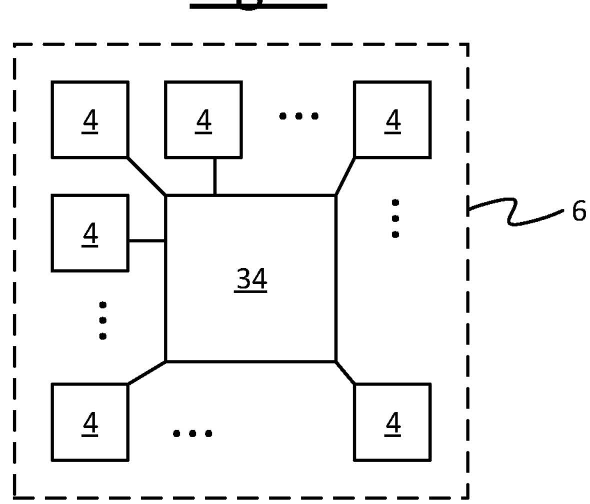
FIG. 5 is a schematic block diagram of a processor comprising an array of constituent processors.

In embodiments, the processor 4 may be connected together with one or more other instances of the processor and/or external devices such as a network interface or network attached storage (NAS) device. As illustrated in FIG. 5, in embodiments the processor 4 may form one of an array 6 of interconnected processor tiles, each tile running part of a wider program. The individual processors 4 (tiles)

thus form part of a wider processor or processing system 6. The tiles 4 may be connected together via an interconnect subsystem 34. The tiles 4 may be implemented on the same chip (i.e. die) or on different chips, or a combination (i.e. the array may be formed from multiple chips each comprising multiple tiles 4). The interconnect system 34 and exchange interface 51 may therefore comprise an internal (on-chip) interconnect mechanism and/or external (inter-chip) exchange mechanism, accordingly.

Figure 6:
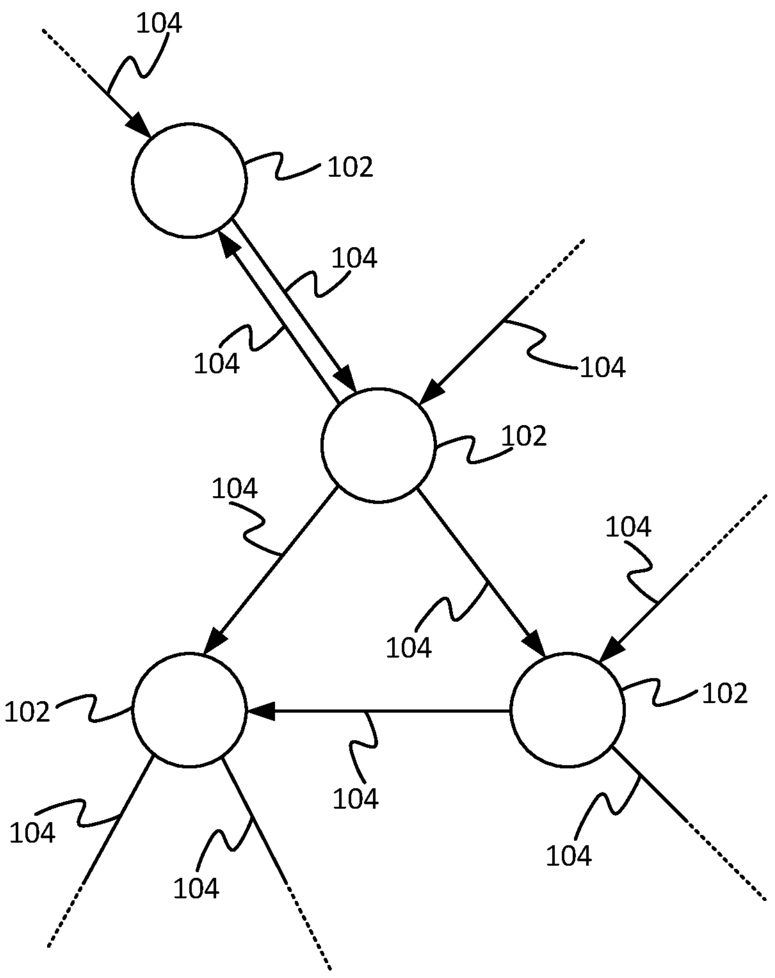
FIG. 6 is a schematic illustration of a graph used in a machine intelligence algorithm.

In one exemplary application of a multi-threaded and/or multi-tiled processor or system, the program run across the multiple threads and/or tiles 4 comprises a machine intelligence algorithm, such as an algorithm configured to train a neural network and/or to perform inference based on a neural network. In such embodiments each worker thread, or the part of the program run on each tile, or each worker thread on each tile, is used to represent a different node 102 in a neural network (a type of graph); and communications between threads and/or tiles, accordingly, represent edges 104 between nodes 102 in the graph. This is illustrated in FIG. 6.

Machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or cost, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph such as a neural network. In this case at least some of the edges 104 between nodes 102 correspond to the exchanges of data between threads, and some may involve exchanges between tiles. In the case of a multi-tile arrangement 6 with multiple threads per tile 4, each tile 4 runs a subgraph of the graph.

Each subgraph comprises a supervisor subprogram comprising one or more supervisor threads, and a set of worker threads representing the nodes 102 of the respective subgraph.

Figure 7:
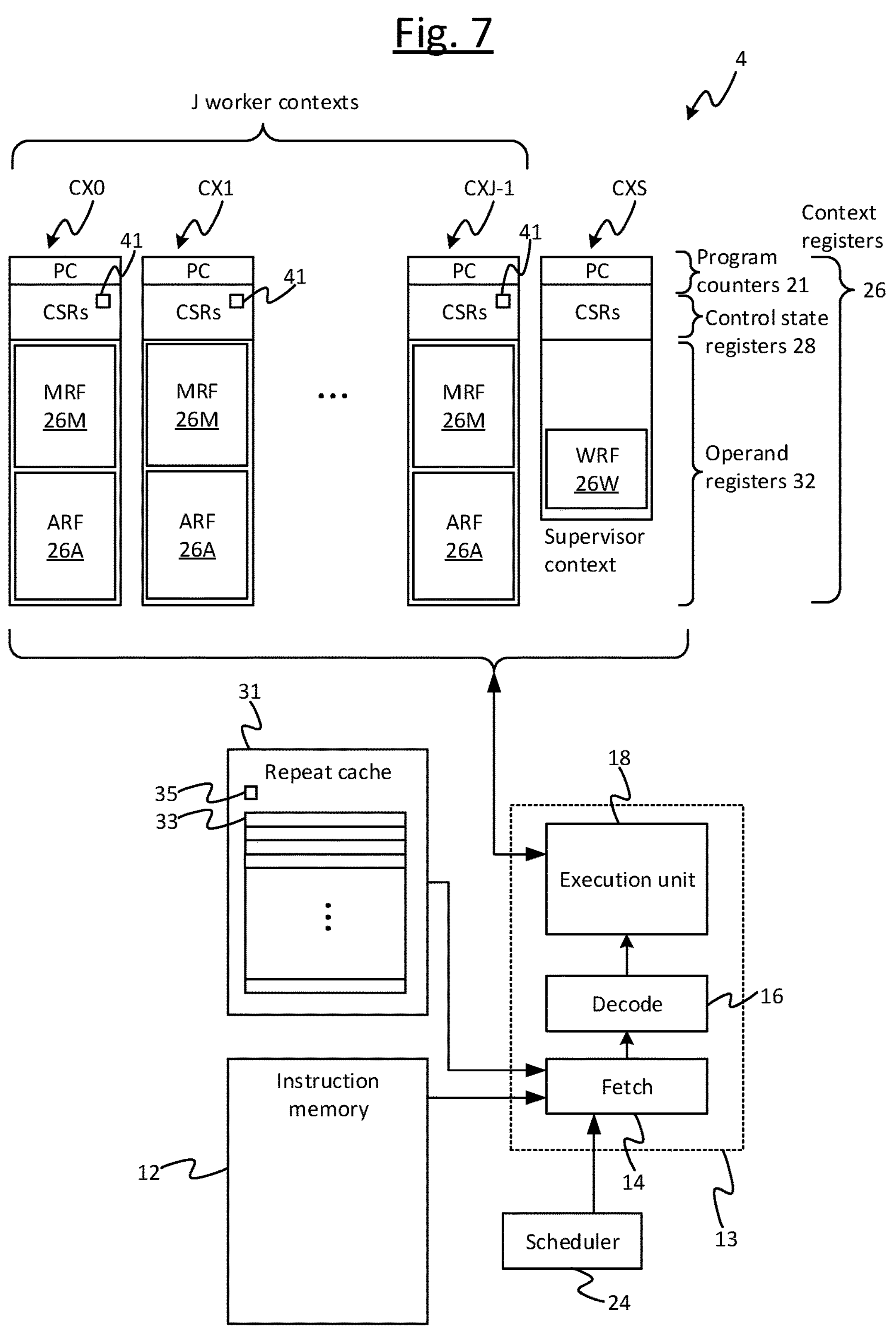
FIG. 7 is schematic block diagram showing an example repeat cache according to embodiments disclosed herein.

FIG. 7 illustrates an example implementation of an advantageous repeat cache mechanism in accordance with embodiments of the present disclosure. This may find an application in machine learning, but is not limited to such applications. The mechanism is based around providing a repeat instruction ("rpt") in the instruction set of the processor 4. The functionality of the repeat instruction is configured such that not only a) a first thread which executes it caches a portion of its own code and repeats this portion of code, but also b) the next thread to execute the repeat instruction will also repeat the portion of code cached from the first thread. Thus the same code can be re-used and duplicated across multiple threads without re-fetching from memory 12. In embodiments the same code is re-used in multiple different threads each to operate on their own respective operand values in their own respective register file 26, e.g. own respective ARF, 26A.

The inventors have identified that opportunities arise in the fields of machine learning and neural networks to re-use code between threads, in the case where each thread represents a different respective node in a graph (e.g. neural network) and some of the nodes perform some or all of the same computational processes. For instance, the threads representing some nodes may perform one or more of the same operations on their own respective input data. In fact in some cases, the threads of some nodes may perform the same operation on some of the same operand values as one another, but on some other operands that are specific to the individual thread. An example would be a vector or matrix multiplication performed as part of a convolution, whereby the instruction in each thread multiplies a common set of weights (shared between threads) with input data that is specific to the individual thread. This can occur in a convolutional neural network where many nodes in fact comprise the same weights but with different connections. Each thread may be configured to perform the processing of a different respective node in the neural network, such as convolving a common kernel of weights with respective input data to detect a certain feature.

In such scenarios, it would be advantageous to provide a mechanism allowing a portion of code from one thread to be re-used in one or more other threads without each thread having to separately re-fetch it from memory, thus reducing power consumption in scenarios where threads perform some or all of the same operations. E.g. this may be used to in scenarios where the same operations are to be performed by each thread on a combination of one or more common weight operands shared between threads and one or more operands specific to the individual respective thread.

The advantage of the repeat-cache in such scenarios is that instruction fetches from memory 12 are expensive in terms of energy. For instance, since many inner loops in applications such as neural networks (those loops used for convolution for example) are small (a handful of instructions or bundles), and since it's common for workers to execute those same loops, this provides an opportunity for power saving by implementing a small, local and energy efficient cache 31 inside tile 4. So rather than all workers performing expensive fetches to memory, for the same code, they can use the more energy efficient cache instead.

As shown in FIG. 7, according to the present disclosure the processor 4 comprises an instruction cache comprising at least a repeat cache 31. The repeat cache 31 comprises a temporary storage area 33 for temporarily holding a plurality of cached instructions in order. The repeat cache 31 also has an associated means 35 of recording a state of the cache, the state comprising at least a record of whether or not the cache is currently "claimed" (or "owned") by one of the threads. The meaning of this will become apparent shortly. The state 35 may be implemented as an internal state of the repeat cache 31 (i.e. hardware circuitry in the form of one or more internal latches). Alternatively the state 35 could be implemented as a register in a register file, e.g. as a control state register 28 of one of the contexts such as the supervisor context.

The instruction fetch stage 14 of the pipeline 13 is operable to fetch instructions from either the instruction memory 12 or the repeat cache 31. Which source of instructions is used at any given time depends on the repeat instruction and its operands, as will be discussed in more detail shortly.

As illustrated in FIG. 7, each of the J worker threads that can be executed concurrently is allocated to a different respective one of a plurality of J sets of context registers 26 (CX0 . . . CXJ−1), each set being arranged to hold the program state of its respective worker. In embodiments an additional set of context registers 26 (CXS) is provided to hold the program state of the supervisor thread. Each set of context registers comprises a respective program counter (PC) 21 for holding the current PC value of the respective thread. The program pointer specifies the current point in the thread's respective code from which its instructions are to be fetched. Each set of context registers also comprises operand registers 32 for temporarily holding operands operated upon by the instructions of the respective thread. The operand registers 32 of each worker thread may comprise the MRF 26M and ARF 26A of the respective thread. The operand registers 32 of the supervisor may comprise the WRF 26W. Each set of context registers may further comprise a respective one or more control state registers (CRSs) 28 for recording a status of the respective thread, such as whether it is currently paused.

For each thread, the pipeline 13 begins by fetching and executing instructions from the instruction memory 12 according to its respective program counter (PC). In preferred embodiments the repeat instruction (rpt) takes the following syntax:

Rpt $size, $count

I.e. it takes two operands: a repeat size operand specifying a size of a portion of repeat code, and a repeat count operand specifying a number of times the portion is to be repeated. In embodiments these operands specify their respective values by reference to a register. I.e. the value included directly in the operand field of the instruction identifies a register $size or $count, e.g. in the MRF 26M of the respective thread, from which to take the actual repeat size or repeat count value, respectively. Alternatively however, either or both of these could be immediate operands (i.e. the repeat size and/or repeat count values are encoded directly into the relevant operand field of the repeat instruction).

In operation, the execution unit 18 and fetch stage 14 are configured to operate as follows in response to the repeat instruction. The first thread to execute rpt $size, $count will claim the repeat cache 31. This may also be described as locking the repeat cache 31, or "owning" the repeat cache. In practice, this means the execution unit 18 sets the state 35 of the repeat cache 31 to mark it is claimed. After that, any subsequent worker to execute the repeat instruction cannot claim the repeat cache until the state 35 is reset (see below).

When a worker executes the rpt, this instruction informs the instruction fetcher logic 14 to look in the repeat-cache for the instruction fetches. The execution of the repeat instruction in the first worker will cause the execution unit 18 to fill the repeat cache 31 with the subsequent N instructions or instruction bundles of that worker immediately following the position of the repeat instruction in the code, where N is specified in $size (unless $ size is bigger than the capacity of the repeat cache, in which case only the first part of the repeat body is stored in the repeat cache 31). The execution unit 18 also executes those instructions a first time through while being cached. Subsequently, immediately after the end of the portion of N instructions, the fetch stage 14 is caused to go back and start fetching the code from the storage area 33 of the instruction cache 31, and the cached portion of code is then repeated from there a number of times specified in $count. This may involve branching the program counter PC 21 of the respective thread. After the end of the last repetition, the program continues from, the point immediately following the cached portion of code.

If another instance of the repeat instruction is executed as part of a second of the worker threads while the repeat cache is still claimed (locked) according to its state 35, then the execution of the repeat instruction causes the execution unit 18 to carry out a different functionality with respect to the second thread. That is, the fetch stage 14 is controlled to begin fetching the cached portion of code from the storage area 31 of the instruction cache 31 (the portion of code that was cached from the first thread). It will then repeat the execution of this portion of cached code, but a number of times specified by the respective $count operand of the second worker thread.

Thus the repeat instruction provides a zero-overhead loop facility, causing the subsequent sequence of instructions or execution bundles (the repeat body) to be executed repeatedly. The repeat-count can be provided as an immediate or as an unsigned register source value. The size of the repeat-body is expressed in a whole number of instructions or execution bundles and provided by an immediate (e.g. with the repeat-body size being (immediate+1) execution).

Note: the lookup in the repeat cache can still fail in two ways. The first is if the second worker has executed a different instance of the repeat instruction (residing at a different location in memory) and hence the body of the repeat loop isn't in the cache 31. In this case the instruction fetch logic 14 will report to fetching from memory 12. The second way is if the length of the repeat body exceeds the capacity of the repeat-cache, in which case the tail end of the repeat-body will not be found inside the repeat-cache and the fetch to instruction memory 12 must still be performed.

The repeat cache 31 provides a small, (mostly) architecturally invisible instruction cache aimed at reducing code overhead and thus power consumption during, e.g., high-compute kernel inner-loops, particularly when a number of worker contexts are performing the same task. The cache 31 is shared amongst worker contexts, and in embodiments is reserved specifically to only cache instructions or bundles within the repeat bodies of instances of the repeat instruction.

In embodiments the storage area 33 of the repeat-cache consists of a number of independent lines, each sized the same size as an instruction (in the case of individual instruction issue) or an instruction bundle (in the cased where the processor 4 executes bundles of co-issued instructions). Each line may be either valid or invalid. All lines are invalid initially. In embodiments, since the execution bundles are within the repeat bodies of the repeat instruction, those bundles should preferably also be aligned in tile memory (e.g. 8-byte aligned).

The repeat cache 31 is either locked or unlocked. When unlocked (the initial state), the repeat-cache becomes locked as a side effect of a worker thread (the locking context) executing an instance of the repeat instruction. If the repeat-cache 31 is already locked when a worker context executes a repeat instruction, no further action is taken in that respect.

There are at least two possibilities for implementing the mechanism for resetting the state 35 so that the claiming (locking) of the repeat cache can be freed again.

The first is that, when the worker thread which owns the repeat cache executes the very last instruction in the repeat loop, the repeat cache 31 is unlocked and all lines 33 are marked as invalid. Any other worker context currently using the repeat cache 31 will now fetch the code from memory 12 rather than the repeat cache 31. This requires a means for recording which of the worker threads (or rather which context, or which slot) claimed the instruction cache 31 (i.e. which one caused it to be locked). This could be implemented as a state in the internal state of the cache 31, or in a register in one of the register files 26.

The second, preferred alternative is that a flag 41 is kept for each context (each of the concurrent threads, or each of the slots). E.g. this may be implemented in one of the control state registers 28 of the respective context. Once the repeat cache is locked, the flag is set for each worker thread that uses (hits) the repeat cache. Every time a context executes the last instruction in its repeat loop, if the only flag that is set is the one owned by this thread (i.e. all the other flags are clear), then the repeat-cache 31 is unlocked. Either way the flag 41 owned by this thread is cleared. I.e. when the last context that is using the repeat cache finishes its repeat loop, the repeat cache 31 is unlocked.

Note: where it is said which thread claims the cache 31, this means which of the concurrent threads, i.e. which currently allocated to one of the time slots and associated set of context registers 26. Equivalently it may be said, which of the contexts 26 (CX0 . . . CXJ−1) claims the cache, or which of the slots S0 . . . SJ−1 claims the cache. "Context" sometimes in the art also used as a short hand for the set of registers 26 holding the context (in the sense of the program state), or the slot in which the respective thread executes; or indeed the whole arrangement of thread, slot, program state and context registers.

Locking the repeat-cache 31 initiates a cache fill operation. That is, when locked, execution of each successive execution instruction or bundle at the head of the repeat body of the locking context causes: i) a single line to be allocated to that instruction or bundle address, ii) the instruction or execution bundle data to be written to the allocated line, and iii) the line set as valid. If the size of the repeat body is greater than the capacity of the repeat-cache, only the execution bundles at the head of the repeat body are cached.

When locked, the repeat-cache becomes unlocked when the value of $count (of the locking context) becomes 0 (first reset mechanism), or when the relevant flag is cleared (second reset mechanism). For all worker contexts, when $count is non-zero (i.e. the worker is executing a repeat body), the instruction-fetch mechanism will check for the presence of a valid line allocated to the instruction or execution bundle address and in the case of a hit, use the contents of the cache line rather than performing a fetch from tile memory.

In embodiments, if the repeat-count is zero initially, the repeat instruction will act as a branch over the repeat-body. Otherwise, the subsequent repeat-body Execution Bundles will be executed $count times.

In embodiments that execute bundles of co-issued instructions, any instruction co-issued with the repeat instruction is executed only once, and is not part of the repeat-body.

In embodiments, it may not be allowed to execute certain types of instructions within a repeat body. In this case an exception will be raised in an attempt to execute such an instruction.

It will be appreciated that the above embodiments have been described by way of example only.

For instance, in alternative implementations, the syntax of the repeat instruction does not necessarily require a repeat size operand. Instead, the size of the cached portion could be fixed (implicit) or specified by some other piece of state, e.g.

a setting of the repeat cache set by the supervisor. Note also that the size of the repeat-body does not have to match the size of the repeat cache.

Or in more complex implementations, the cached instructions (repeat body) need not necessarily start from the instruction or bundle immediately following the repeat instruction. E.g. instead the syntax of the repeat instruction could allow a start and end point of the repeat body to be specified. Or as another example, the processor could continually cache the last M instructions in a rolling fashion, and then the repeat count operand causes the last N of those leading up to the repeat instruction to be cached. I.e. the repeat instruction could be executed after, rather than before the body of the loop.

In further alternative or additional variants, the processor 4 does not necessarily require a dedicated hardware mechanism 41 for resetting the claim to the repeat cache 31 (i.e. unlocking the repeat cache). In alternative implementations, this could be reset explicitly by software in one of the workers or the supervisor, e.g. by executing a put instruction to write to a register linked to the repeat cache such as 35 in the case where this is implemented as a writeable register in a register file).

Further, the scope of the present disclosure is the above-described architecture in which a separate context is provided for the supervisor thread, or in which the supervisor thread runs in a slot and then relinquishes its slot to a worker. The supervisor could instead use a general purpose context. Or in another arrangement for example, the supervisor may run in its own dedicated slot. Further, the implementation is not limited to specific one of the threads even having a supervisor role. Further, the scope of the disclosure is not limited to the processor 4 being a tile in an array of tiles. In alternative embodiments the processor 4 could for example be a stand-alone processor or single-chip processor.

The implementation is not limited to separate MRF and ARF. Nor is it limited to use of a separate WRF. In general the registers could be from any one or more register files, which could be shared between different memory access and arithmetic operations, or separated.

Further, the scope of the disclosure is not limited to machine learning applications. There are many other applications where it may be desired to reuse code between threads in order to reduce code overhead and thus improve code density.

Other variants or use cases of the disclosed techniques may become apparent to the person skilled in the art once given the disclosure herein. The scope of the disclosure is not limited by the described embodiments but only by the accompanying claims.

The invention claimed is:

1. A method of operating a processor having a barrel-threaded execution unit configured to run a plurality of concurrent threads each in a different respective one of a repeating sequence of interleaved time slots, the method comprising:

running a program comprising the plurality of concurrent threads on the processor through the execution unit, a first thread of the threads including a first instance of a repeat instruction, the repeat instruction being a machine code instruction that is defined by an opcode and that takes a repeat count operand;

executing the first instance of the repeat instruction, including, in response to the opcode of the repeat instruction:

determining that a repeat cache of the processor is not claimed;

caching a first portion of code from the first thread into the repeat cache;

recording the repeat cache as claimed; and executing the first portion of code a first number of times according to the repeat count operand of the first instance of the repeat instruction, taking at least one successive repetition of the first portion of code from the repeat cache; and resetting a state of the repeat cache as unclaimed once at least the first thread has finished executing the first portion of code the first number of times;

the method further including:

in the first thread, executing a second instance of the repeat instruction in which the repeat count operand is zero, the second instance of the repeat instruction causing the execution unit to cache a second portion of code from the first thread into the repeat cache and skip execution of the second portion of code in the first thread; and executing a third instance of the repeat instruction included in a second thread of said threads, including, in response to the opcode of the repeat instruction, executing the second portion of code from the repeat cache a second number of times according to the repeat count operand of the third instance of the repeat instruction, taking at least one successive repetition of the second portion of code from the repeat cache.

2. The method of claim 1, wherein said first portion of code is a portion following the first instance of the repeat instruction in the first thread.

3. A processor comprising:

an execution unit configured to execute instances of instructions defined in an instruction set, wherein the execution unit is a barrel-threaded execution unit configured to run a plurality of concurrent threads each in a different respective one of a repeating sequence of interleaved time slots; and a repeat cache having an associated state recording whether or not the repeat cache is currently claimed by one of the threads;

wherein the instructions defined in the instruction set include a repeat instruction which takes a repeat count operand, the execution unit being configured so as:

in response to the opcode of the repeat instruction and in response to the repeat cache being not currently claimed according to said state and a first instance of the repeat instruction being executed in a first thread of said threads:

to cache a first portion of code from the first thread into the repeat cache, to modify said state to record the repeat cache as claimed, and to execute said first portion of code a respective number of times, taking each successive repetition of the first portion of code from the repeat cache;

wherein the processor is configured to reset said state to record the repeat cache as unclaimed again once at least the first thread has finished executing the first portion of code the respective number of times;

the execution unit further configured to, after the reset of said state:

in the first thread, execute a second instance of the repeat instruction in which the repeat count operand is zero, the second instance of the repeat instruction causing the execution unit to cache a second portion of code from the first thread into the repeat cache and skip execution of the second portion of code in the first thread; and execute a third instance of the repeat instruction included in a second thread of said threads, including, in response to the opcode of the repeat instruction, executing the second portion of code from the repeat cache a second number of times according to the repeat count operand of the third instance of the repeat instruction, taking at least one successive repetition of the second portion of code from the repeat cache.

4. The processor of claim 3, wherein said first portion of code is a portion following the first instance of the repeat instruction in the first thread.

* * * * *